(12) United States Patent
Yang et al.

(10) Patent No.: US 7,733,938 B2
(45) Date of Patent: Jun. 8, 2010

(54) METHODS AND APPARATUSES FOR CHANNEL ASSESSMENT

(75) Inventors: Shun-Pin Yang, Chang-Hua (TW); Hong-Kai Hsu, Taipei County (TW); Chung-Shine Huang, Taipei Hsien (TW); Liang-Cheng Chang, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 309 days.

(21) Appl. No.: 11/853,066

(22) Filed: Sep. 11, 2007

(65) Prior Publication Data

US 2009/0041088 A1    Feb. 12, 2009

Related U.S. Application Data

(60) Provisional application No. 60/955,023, filed on Aug. 9, 2007.

(51) Int. Cl.
*H04B 1/00* (2006.01)
(52) U.S. Cl. .................. 375/132; 370/241; 370/433
(58) Field of Classification Search .......... None
See application file for complete search history.

(56) References Cited

U.S. PATENT DOCUMENTS

| 5,625,877 | A  | * | 4/1997 | Dunn et al. ............... 455/454 |
| 5,907,583 | A  | * | 5/1999 | Sakoda et al. ............. 375/260 |
| 6,345,066 | B1 | * | 2/2002 | Haartsen .................. 375/130 |
| 7,079,516 | B2 |   | 7/2006 | You et al. |
| 7,103,316 | B1 |   | 9/2006 | Hall |
| 7,245,613 | B1 | * | 7/2007 | Winkles et al. ........... 370/365 |
| 2002/0080739 | A1 | * | 6/2002 | Kuwahara ................ 370/333 |
| 2002/0136268 | A1 | * | 9/2002 | Gan et al. ................ 375/133 |
| 2002/0155808 | A1 | * | 10/2002 | Kawamura ............. 455/3.05 |
| 2003/0147453 | A1 | * | 8/2003 | Batra ..................... 375/132 |
| 2004/0085999 | A1 | * | 5/2004 | Burnett et al. ............ 370/474 |
| 2005/0005227 | A1 |   | 1/2005 | Felbecker et al. |
| 2006/0013172 | A1 |   | 1/2006 | Ruuska et al. |
| 2006/0133543 | A1 | * | 6/2006 | Linsky et al. ............ 375/341 |
| 2006/0188004 | A1 |   | 8/2006 | Kizu et al. |
| 2008/0219323 | A1 | * | 9/2008 | Desai et al. .............. 375/132 |

FOREIGN PATENT DOCUMENTS

CN           1437329          8/2003

OTHER PUBLICATIONS

PCT Search Report mailed Nov. 13, 2008.
English abstract of CN1437329.

* cited by examiner

*Primary Examiner*—Kevin C Harper
*Assistant Examiner*—Steven Wood
(74) *Attorney, Agent, or Firm*—Thomas, Kayden, Horstemeyer & Risley

(57) ABSTRACT

An embodiment of an apparatus for channel assessment is provided, comprising a radio frequency (RF) unit, a baseband unit and a microprocessor control unit (MCU). The baseband unit coupling to the RF unit directs the RF unit to selectively hop into one of a plurality of available channels in a frequency band using a pseudorandom sequence to receive a plurality of packets via the hopped channel. The MCU coupling to the baseband unit accumulates a measure for the hopped channel according to reception results of the packets and marks the hopped channel as a bad channel when the accumulated measure exceeds a predetermined threshold. The measure represents the inaccuracy extent during packet reception via the hopped channel.

18 Claims, 16 Drawing Sheets

| CH# | Header Error Score | Confidence Level for Header Error Score | Data Error Score | Confidence Level for Data Error Score | Bad Channel Flag |
|---|---|---|---|---|---|
| 0 | $E_H(0)$ | $N_H(0)$ | $E_D(0)$ | $N_D(0)$ | $F(0)$ |
| 1 | $E_H(1)$ | $N_H(1)$ | $E_D(1)$ | $N_D(1)$ | $F(1)$ |
| 2 | $E_H(2)$ | $N_H(2)$ | $E_D(2)$ | $N_D(2)$ | $F(2)$ |
| 3 | $E_H(3)$ | $N_H(3)$ | $E_D(3)$ | $N_D(3)$ | $F(3)$ |
| 4 | $E_H(4)$ | $N_H(4)$ | $E_D(4)$ | $N_D(4)$ | $F(4)$ |
| ⋮ | ⋮ | ⋮ | ⋮ | ⋮ | ⋮ |
| n-3 | $E_H(n-3)$ | $N_H(n-3)$ | $E_D(n-3)$ | $N_D(n-3)$ | $F(n-3)$ |
| n-2 | $E_H(n-2)$ | $N_H(n-2)$ | $E_D(n-2)$ | $N_D(n-2)$ | $F(n-2)$ |
| n-1 | $E_H(n-1)$ | $N_H(n-1)$ | $E_D(n-1)$ | $N_D(n-1)$ | $F(n-1)$ |

| CH# | Header Error Score | Confidence Level for Header Error Score | Data Error Score | Confidence Level for Data Error Score | Bad Channel Flag |
|---|---|---|---|---|---|
| 0 | $E_H(0)$ | $N_H(0)$ | $E_D(0)$ | $N_D(0)$ | $F(0)$ |
| 1 | $E_H(1)$ | $N_H(1)$ | $E_D(1)$ | $N_D(1)$ | $F(1)$ |
| 2 | $E_H(2)$ | $N_H(2)$ | $E_D(2)$ | $N_D(2)$ | $F(2)$ |
| 3 | $E_H(3)$ | $N_H(3)$ | $E_D(3)$ | $N_D(3)$ | $F(3)$ |
| 4 | $E_H(4)$ | $N_H(4)$ | $E_D(4)$ | $N_D(4)$ | $F(4)$ |
| ......... | ......... | ......... | ......... | ......... | ......... |
| n-3 | $E_H(n-3)$ | $N_H(n-3)$ | $E_D(n-3)$ | $N_D(n-3)$ | $F(n-3)$ |
| n-2 | $E_H(n-2)$ | $N_H(n-2)$ | $E_D(n-2)$ | $N_D(n-2)$ | $F(n-2)$ |
| n-1 | $E_H(n-1)$ | $N_H(n-1)$ | $E_D(n-1)$ | $N_D(n-1)$ | $F(n-1)$ |

FIG. 4

METHODS AND APPARATUSES FOR CHANNEL ASSESSMENT

CROSS REFERENCE TO RELATED APPLICATIONS

This application claims the benefit of U.S. Provisional Application No. 60/955,023, filed on Aug. 9, 2007.

BACKGROUND

The invention relates to channel assessment, and more particularly, to methods and apparatuses for channel assessment.

Frequency-hopping spread spectrum (FHSS) is a method of transmitting radio signals by rapidly switching a carrier among multiple frequency channels, using a pseudorandom sequence known to both transmitter and receiver. The overall bandwidth required for frequency hopping is much wider than that required to transmit the same information using only one carrier frequency. However, several frequency channels within a frequency band may encounter interference in environments where other wireless technologies are in use. Accordingly, there is a need for methods and apparatuses that dynamically inspect whether each frequency channel therein is a "good" or "bad" channel for subsequent data or voice transmission.

SUMMARY

An embodiment of an apparatus for channel assessment is provided, comprising a radio frequency (RF) unit, a baseband unit and a microprocessor control unit (MCU). The baseband unit coupling to the RF unit directs the RF unit to selectively hop into one of available channels in a frequency band using a pseudorandom sequence to receive packets via the hopped channel. The MCU coupling to the baseband unit accumulates a measure for the hopped channel according to reception results of the packets and marks the hopped channel as a bad channel when the accumulated measure exceeds a predetermined threshold. The measure represents the inaccuracy extent during packet reception via the hopped channel.

An embodiment of an apparatus for channel assessment is provided, comprising a RF unit, a baseband unit and a MCU. The baseband unit coupling to the RF unit directs the RF unit to selectively hop into one of available channels in a frequency band using a pseudorandom sequence to receive packets via the hopped channel. The MCU coupling to the baseband unit determines the hopped channel k as a good channel according to reception results for the packets, and cancels a bad mark for a re-activation channel other than the hopped channel k. Note that any channel without a bad mark can be hopped.

BRIEF DESCRIPTION OF THE DRAWINGS

The invention can be more fully understood by reading the subsequent detailed description and examples with references made to the accompanying drawings, wherein:

FIG. 4 is a diagram illustrating an exemplary channel map;

DETAILED DESCRIPTION

Figure 1:
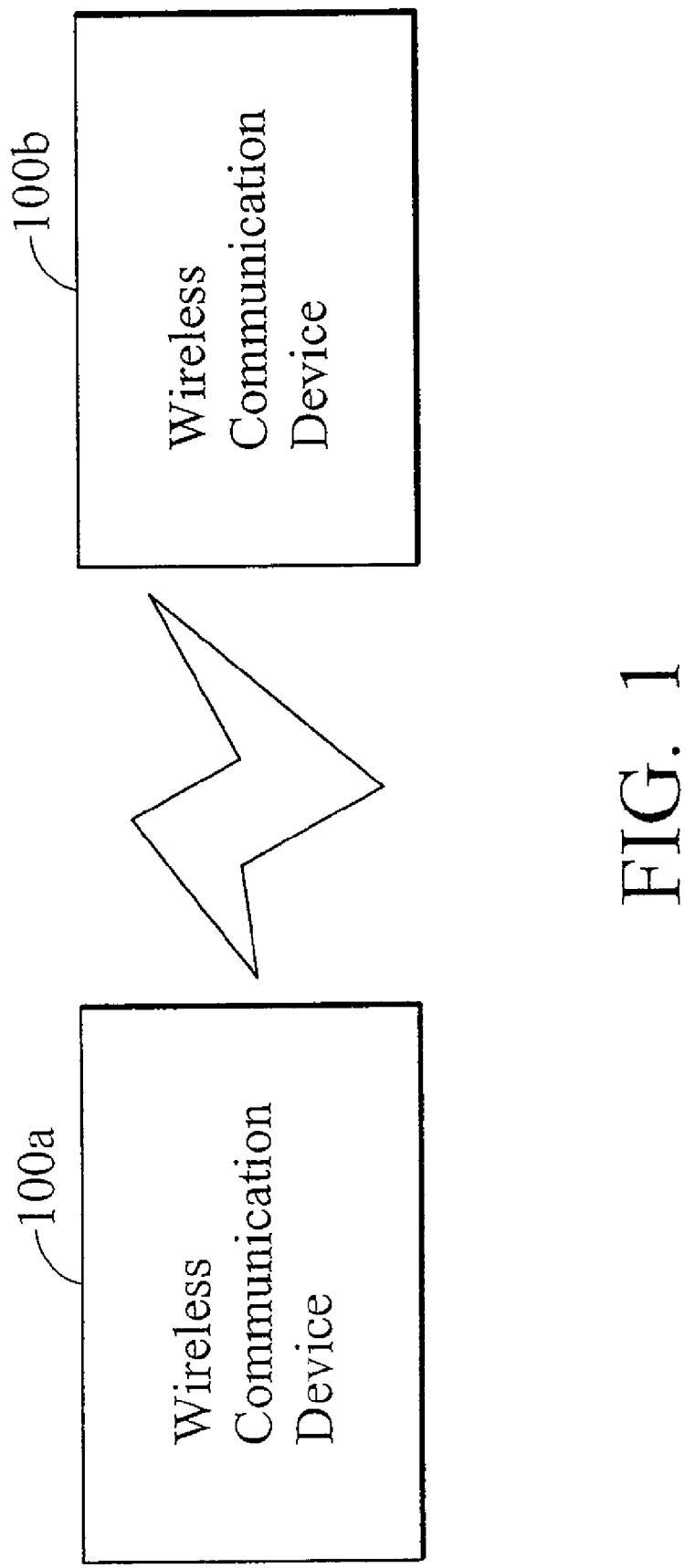
FIG. 1 is a schematic diagram of an embodiment of a communication system.

FIG. 1 is a schematic diagram of an embodiment of a communication system comprising two peer wireless communication devices 11 and 13. Wireless communication devices 11 and 13 transmit and receive radio signals by rapidly switching a carrier among many frequency channels using a pseudorandom sequence with reference to the same hop channel set. Wireless communication devices 11 and 13 may be Bluetooth devices transmitting in the unlicensed frequency band between 2.4 GHz and 2.48 GHz and using a frequency hopping spread spectrum (FHSS) technique that may change its signal many times per second.

Figure 2:
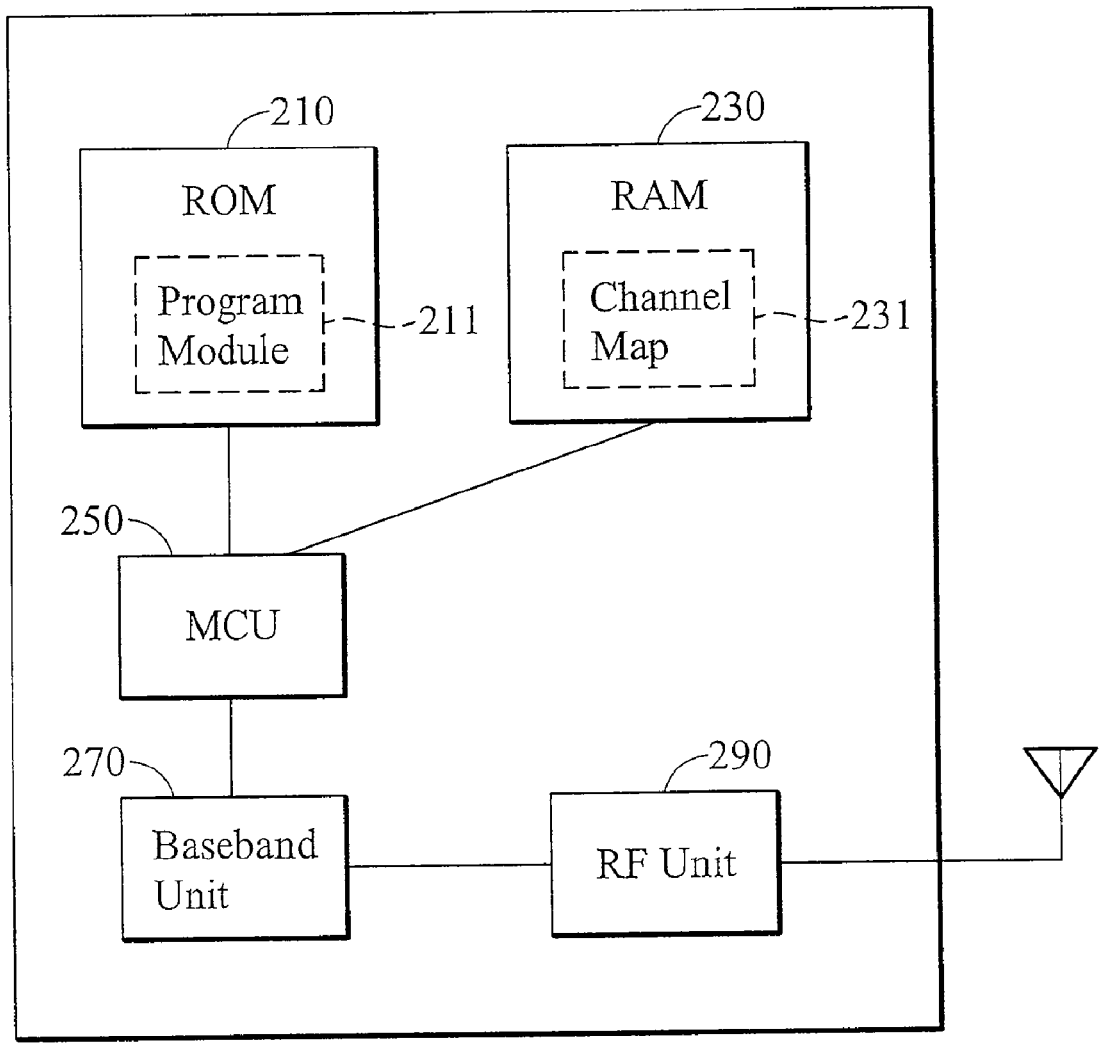
FIG. 2 is a schematic diagram of a hardware environment of an embodiment of a wireless communication device.

FIG. 2 is a schematic diagram of a hardware environment of an embodiment of a wireless communication device (e.g. 11 or 13 of FIG. 1) mainly comprising non-volatile memory 210 storing program modules 211, volatile memory 230 storing a channel map 231, a microprocessor control unit (MCU) 250 (also referred to as a processor), a baseband unit 270, a radio frequency (RF) unit, and a antenna. It is to be understood that, in some embodiments, the MCU 250 may be practiced in the baseband unit 270. The MCU 250 loads and executes program modules to complete channel assessment methods to be described in the following. In some embodiments, the program modules may be stored in the nonvolatile memory 230. The baseband unit 270 employs several well-known methods used for generating an adapted hop channel set. The baseband unit 270 may employ a protocol known to another peer device, with messages for communicating which channels may be used and which are to be avoided according to the updated channel map 231. Accordingly, the baseband unit 270 directs the RF unit 290 to change and lock onto available channels using a pseudorandom sequence known to the peer device for data communication. Details of channel assessment methods and the channel map 231 are to be described in the following.

Figure 3:
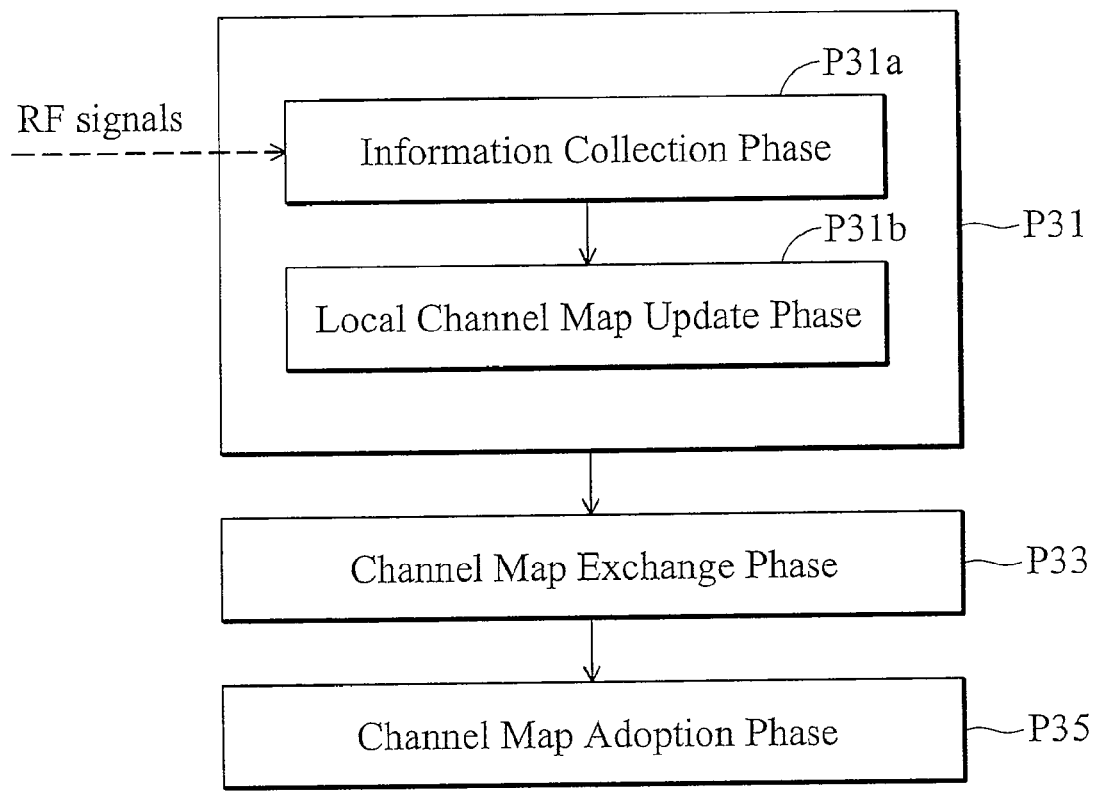
FIG. 3 is a schematic diagram of three exemplary phases of channel assessment.

Embodiments of channel assessment methods can be conceptually divided into three phases: channel map maintenance P31; channel map exchange P33; and channel map adoption P35, as shown in FIG. 3. During the channel map maintenance phase P31, available channels are selectively hopped into, RF signals carried over hopped channels are listened to and acquired, channel quality for hopped channels is determined according to the listened results, and the channel map 231 is modified according to the determined channel quality. The channel map maintenance phase P31 can be further divided into two sub-phases: information collection phase P31a; and local channel map update phase P31b. Several measures are calculated or determined according to the listened results during the information collection phase P31a, and channels are marked as a good channel or a bad channel using predefined rules with reference to the calculated or determined measures during the local channel map update phase P31*b*. Two measure types: packet header measures; and packet data measures are employed in channel assessment. Packet header measures represent the inaccuracy extent of the acquired packet headers, and may be reflected by packet loss, error bits of the acquired packet headers, and/or other statistical characteristics for the acquired packet headers. Packet data measures represent the inaccuracy extent of the acquired packet data, and may be reflected by error bits of the acquired packet data, and/or other statistical characteristics for the acquired packet data. FIG. 4 is a diagram illustrating an exemplary channel map recording information regarding packet header and data measures as shown in header error score and data error score columns, as well as, confidence levels thereof as shown in confidence level for header and data error score columns. Moreover, bad channel flags are stored in the channel map 231, with one indicating a bad channel (i.e. with a bad channel mark), and with zero indicating the reverse (i.e. without a bad channel mark). Those skilled in the art may practice the channel map 230 in various data structures, such as arrays, linked lists, records, data objects, or others, and may use different but similar names for these measures and confidence levels thereof. Details of the determination or calculation of these measures, and operations during the local channel map update phase P31*b* and the information collection phase P3*a* are to be described in the following. During the channel map exchange and adoption phases P33 and P35, a protocol known to another peer device is periodically employed, with messages for communicating which channels may be used and which are to be avoided according to the updated channel map 231, to update their own hop channel sets, moreover, after completing the protocol, both transmitter and receiver communicate therebetween via newly updated hop channel sets. Note that, the communication quality for these adopted channels is measured during the described channel map maintenance phase P31.

Figure 5A:
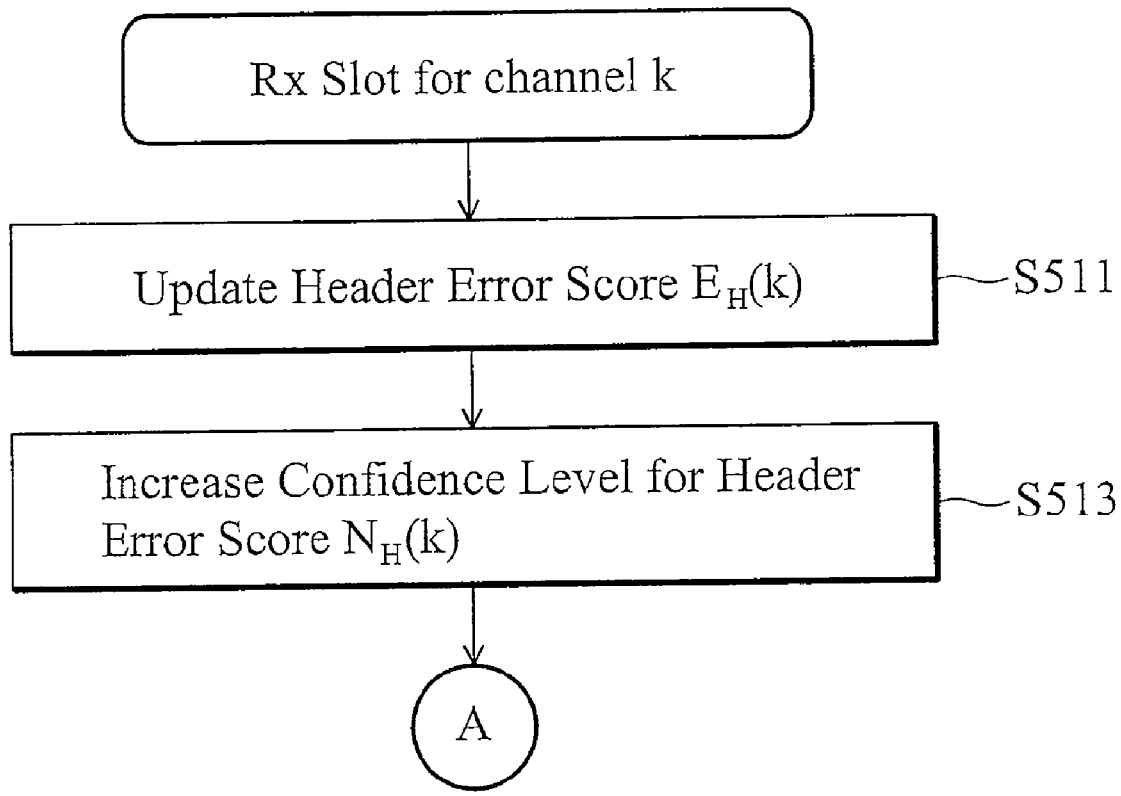
FIGS. 5A to 5C are flowcharts illustrating embodiments of information collection methods for one channel.
Figure 5B:
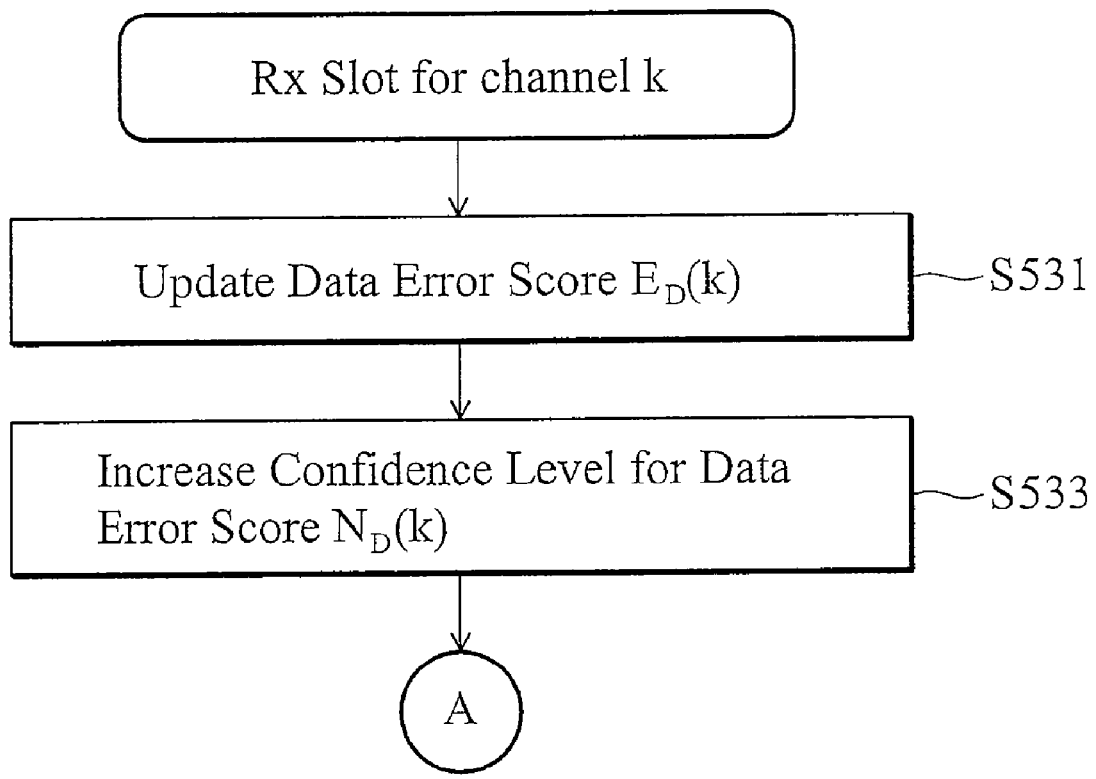
Figure 5C:
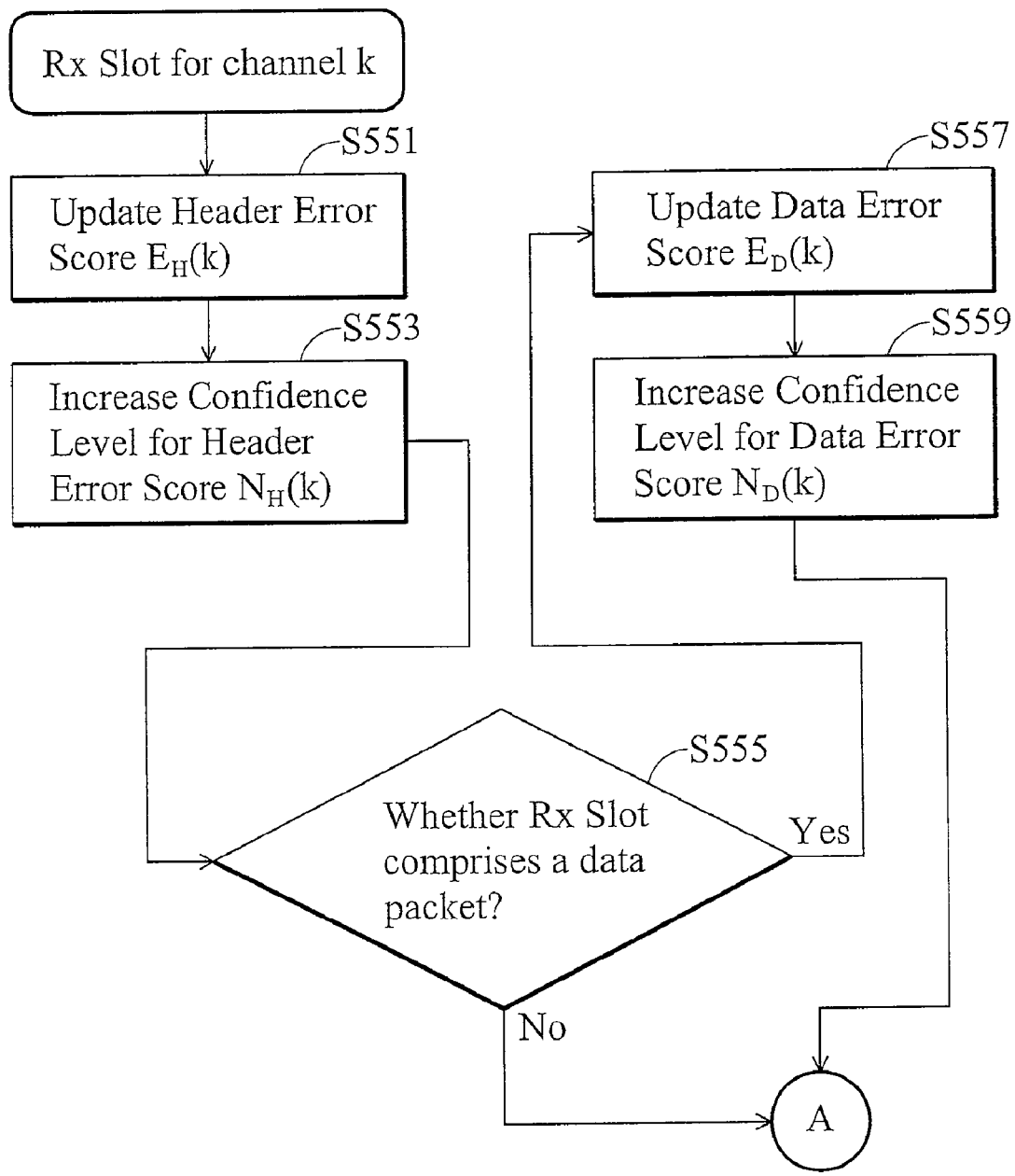

FIGS. 5A to 5C are flowcharts illustrating embodiments of information collection methods for a channel k, employed in the information collection phase P31*a*. The embodiments of information collection methods are performed after acquisition of a listened result for a packet via a hopped channel k. Referring to FIG. 5A, a header error score denoted as $E_H(k)$ is updated (step S511), and a confidence level thereof, denoted as $N_H(k)$, is increased (step S513). Referring to FIG. 5B, a data error score denoted as $E_D(k)$ is updated (step S531), and a confidence level thereof denoted as $N_D(k)$ is increased. Referring to FIG. 5C, a header error score denoted as $E_H(k)$ is updated (step S551), and a confidence level thereof denoted as $N_H(k)$ is increased (step S553). It is determined whether the acquired signal in an Rx slot of the channel k comprises a data packet (step S555) If so, the process proceeds to update data error score denoted as $E_D(k)$ (step S557), and increase a confidence level thereof denoted as $N_D(k)$ (step S559). It is not meant that embodiments of information collection methods can only be applied after acquisition of only one listened result for a packet via a hopped channel k. It should be understood that embodiments of information collection methods can be repeatedly performed to accumulate relevant measures and confidence levels thereof for different hopped channels.

Figure 6:
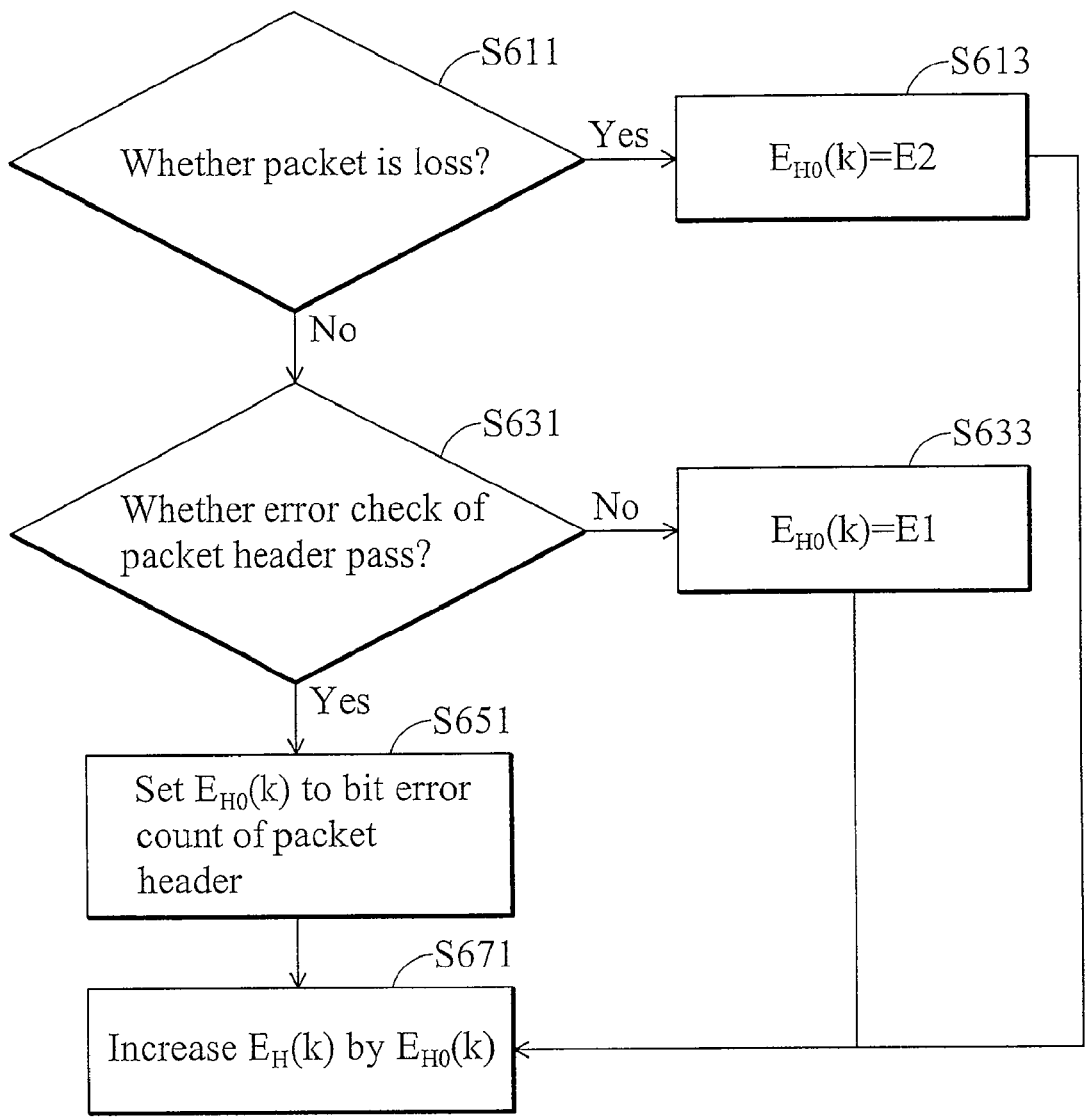
FIG. 6 is a flowchart illustrating an embodiment of determination or calculation for packet error scores.

FIG. 6 is a flowchart illustrating an embodiment of determination or calculation for packet error scores. The process may be applied in a step S511 of FIG. 5A, or a step S551 of FIG. 5C. It is determined whether a packet loss has occurred when listening to the channel k (step S611). The packet loss means receiving no meaningful packets after a predetermined time period. If so, the process proceeds to set a current header error score $E_{H0}(k)$ to a constant E2 (step S613), otherwise, to perform the next determination (step S631). It is determined whether error check for the acquired packet header passes (step S631). For example, a Bluetooth packet header comprises header information of 10 bits with header error check (HEC) of 8 bits, and each bit is repeated 3 times. HEC can be decoded correctly under $10^{-2}$ bit error rate or lower. It is determined that error check for the acquired packet header passes when HEC can be decoded correctly. When the error check for the acquired packet header passes, the process proceeds to calculate bit error count of the acquired packet header, and set $E_{H0}(k)$ to the calculated bit error count (step 651). For example, a bit error count is 2 when a packet header comprising "001000110111" is received and the received packet header is corrected to "000000111111". When the error check for the acquired packet header does not pass, the process proceeds to set $E_{H0}(k)$ to a constant E1 (step 633). Note that E2 is higher than E1. After setting $E_{H0}(k)$ (step S613, S633, or S651), a header error score $E_H(k)$ is increased by $E_{H0}(k)$ (step S671).

Figure 7:
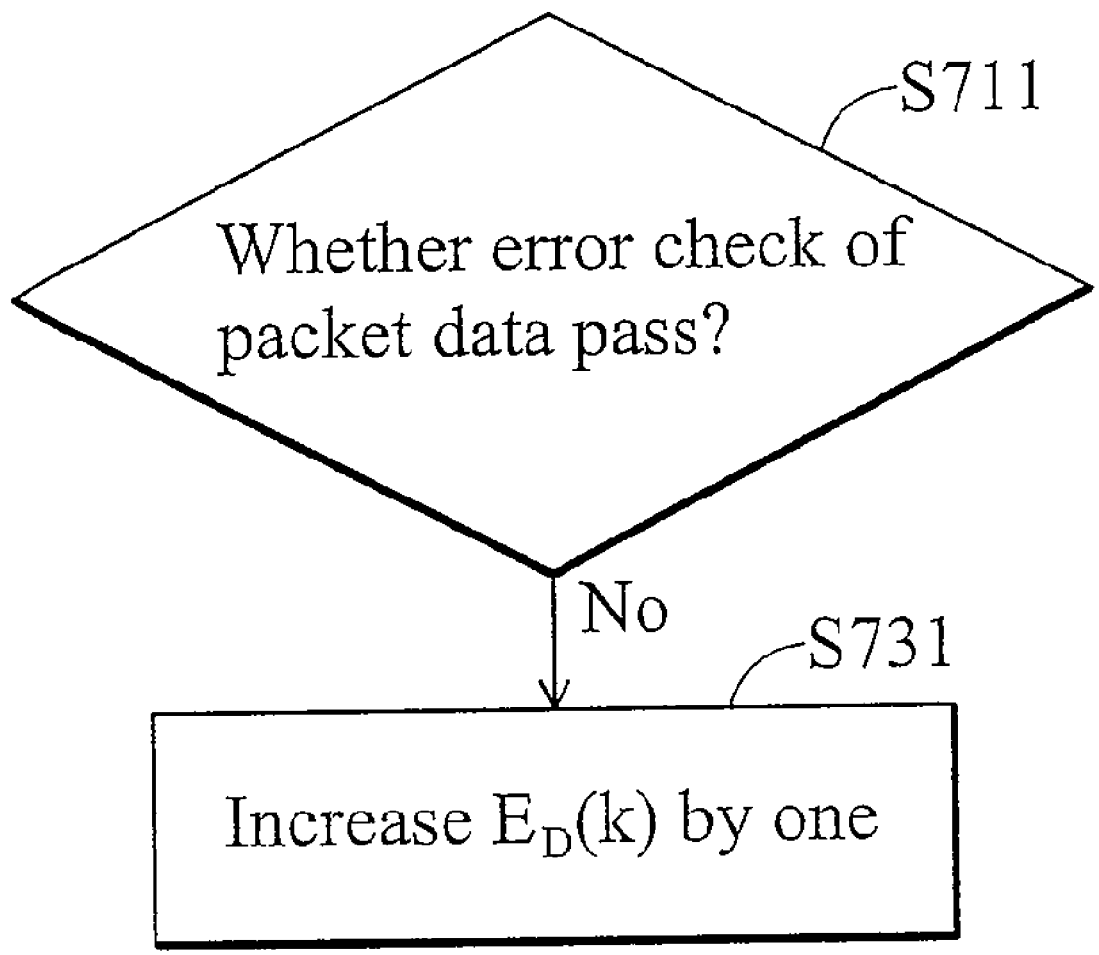
FIG. 7 is a flowchart illustrating an embodiment of determination or calculation for data error scores.

FIG. 7 is a flowchart illustrating an embodiment of determination or calculation for data error scores. The process may be applied in a step S531 of FIG. 5B, or a step S557 of FIG. 5C. It is determined whether error check for the acquired data passes (step S711). For example, data carried by a packet comprises cyclical redundancy checking (CRC) bits. The determination of whether error check for the acquired packet data passes is achieved by inspecting these CRC bits. When the error check for the acquired packet header does not pass, the process proceeds to increase $E_D(k)$ by one (step 731). It is to be understood that speech packets carry no CRC bits and are not guaranteed to be correctly delivered to a destination. The speech packets may contain human voice, or other signals.

Figure 8:
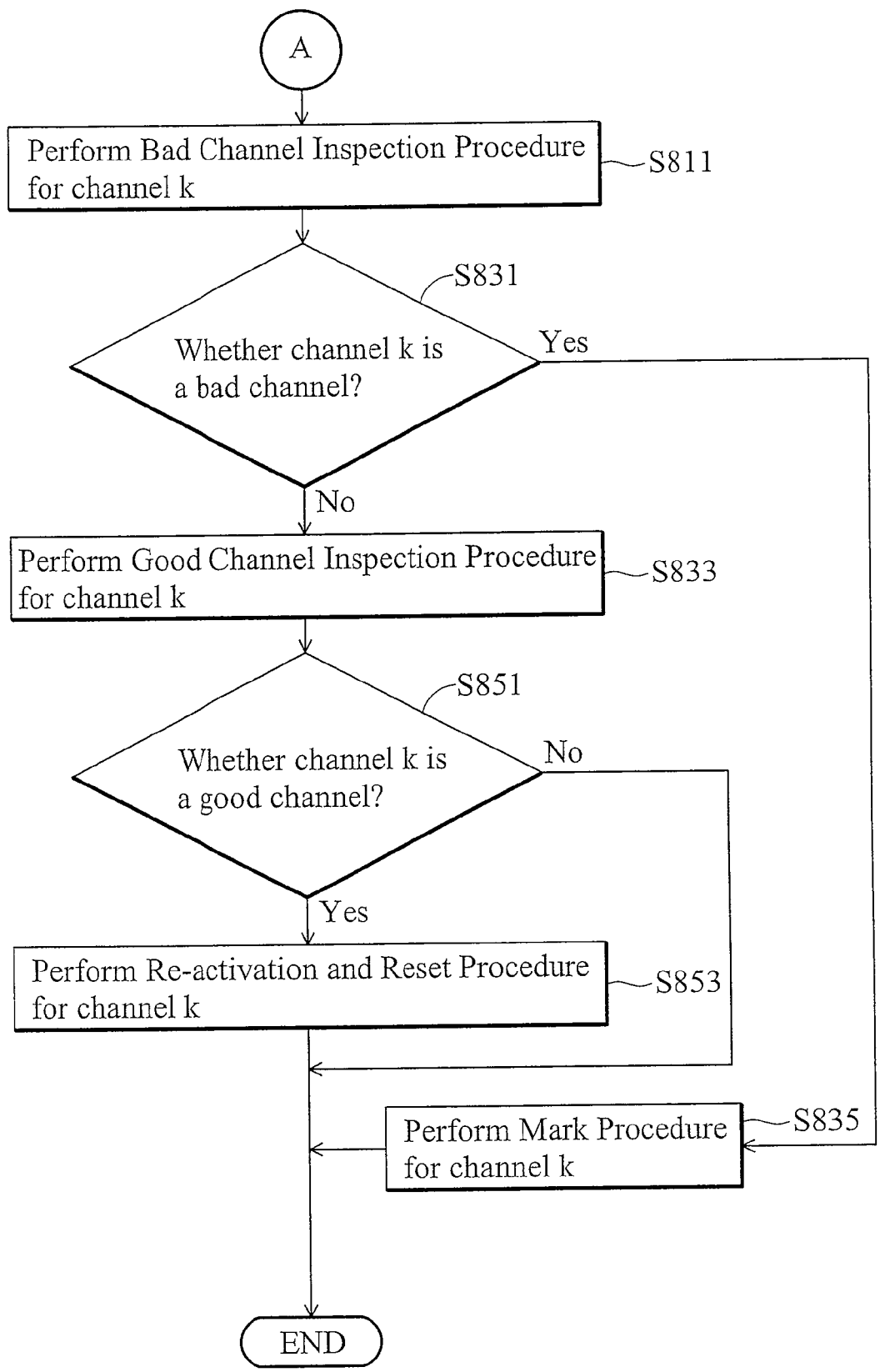
FIG. 8 is a flowchart illustrating an embodiment of information collection methods performed for one channel.

FIG. 8 is a flowchart illustrating an embodiment of channel map update methods performed for a channel k employed in the local channel map update phase P31*b*. A bad channel inspection procedure is performed to determine whether the channel k is a bad channel according to the collected information by the former phase P31*a* (steps S811 and S831). If the channel k is determined as a bad channel, the process proceeds to mark the channel k as a bad channel (step S835), otherwise, to perform a good channel inspection procedure to determine whether the channel k is a good channel according to the collected information by the former phase P31*a* (steps S833 and S851). If the channel k is determined as a good channel, the process proceeds to perform re-activation and reset procedure to cancel bad marks of certain channels (step S853). These channels canceling bad marks may be reused for subsequent data or voice communication after the next channel map exchange and adoption, as shown in phases P33 and P35. It is not meant that the embodiment of channel map update methods can only be applied for one hopped channel k. It should be understood that the embodiment of channel map update methods can be repeatedly performed for different hopped channels.

Figure 9A:
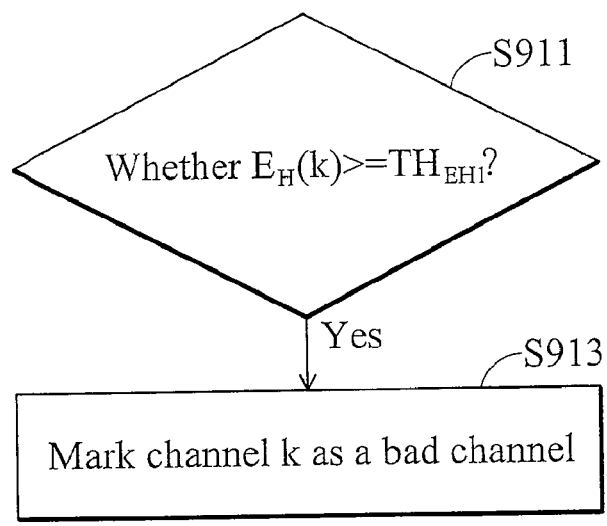
FIGS. 9A to 9C are flowcharts illustrating embodiments of bad channel determination methods for one channel.
Figure 9B:
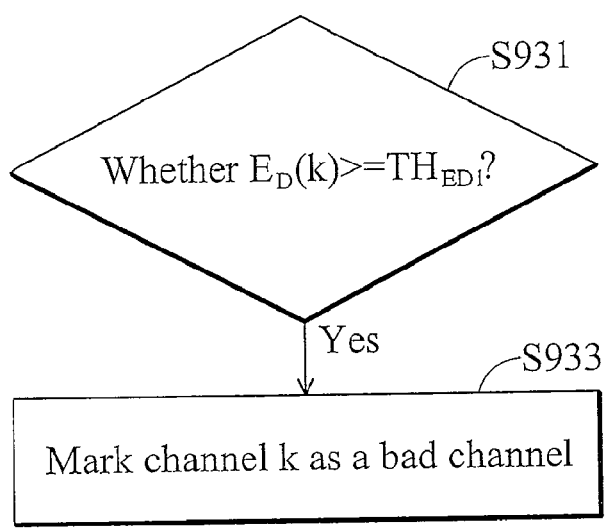
Figure 9C:
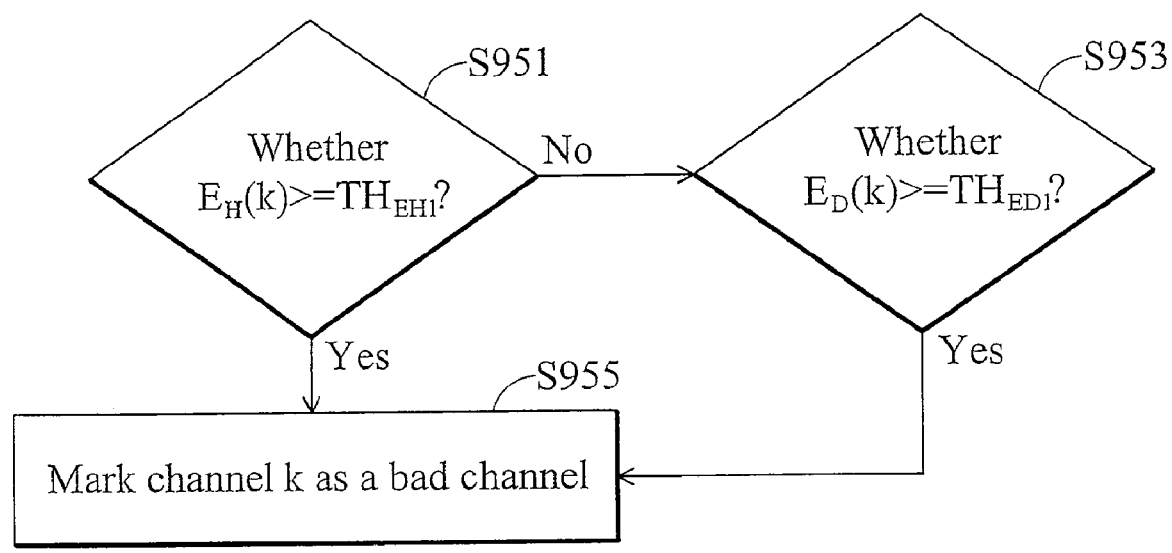

FIGS. 9A to 9C are flowcharts illustrating embodiments of bad channel determination methods for a channel k. These processes may be applied in steps S811, S831 and S835. Referring to FIG. 9A, it is determined whether the header error score $E_H(k)$ is greater than or equals a predetermined threshold $TH_{EH1}$ (step S911). And then, the channel k is marked as a bad channel via a corresponding bad channel flag as shown in FIG. 4 (step S913). Referring to FIG. 9B, it is determined whether the data error score $E_D(k)$ is greater than or equals a predetermined threshold $TH_{ED1}$ (step S931). And then, the channel k is marked as a bad channel via a corresponding bad channel flag as shown in FIG. 4 (step S933). Referring to FIG. 9C, the channel k is marked as a bad channel when the header error score $E_H(k)$ is greater than or equals a predetermined threshold $TH_{EH1}$ (steps S951 and S955), or the data error score $E_D(k)$ is greater than or equals a predetermined threshold $TH_{ED1}$ (steps S953 and S955).

Figure 10A:
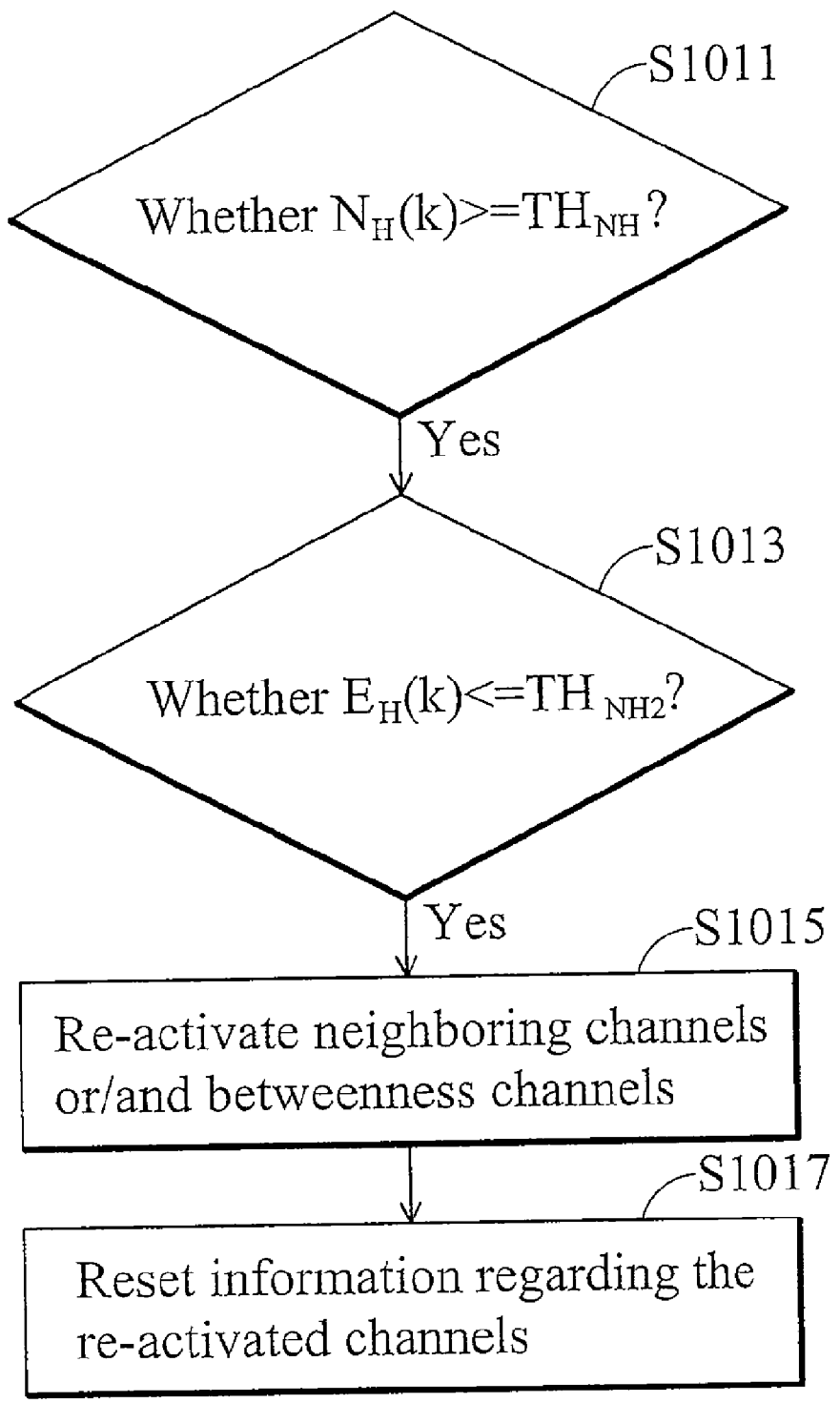
FIGS. 10A to 10C are flowcharts illustrating embodiments of good channel determination methods for one channel.
Figure 10B:
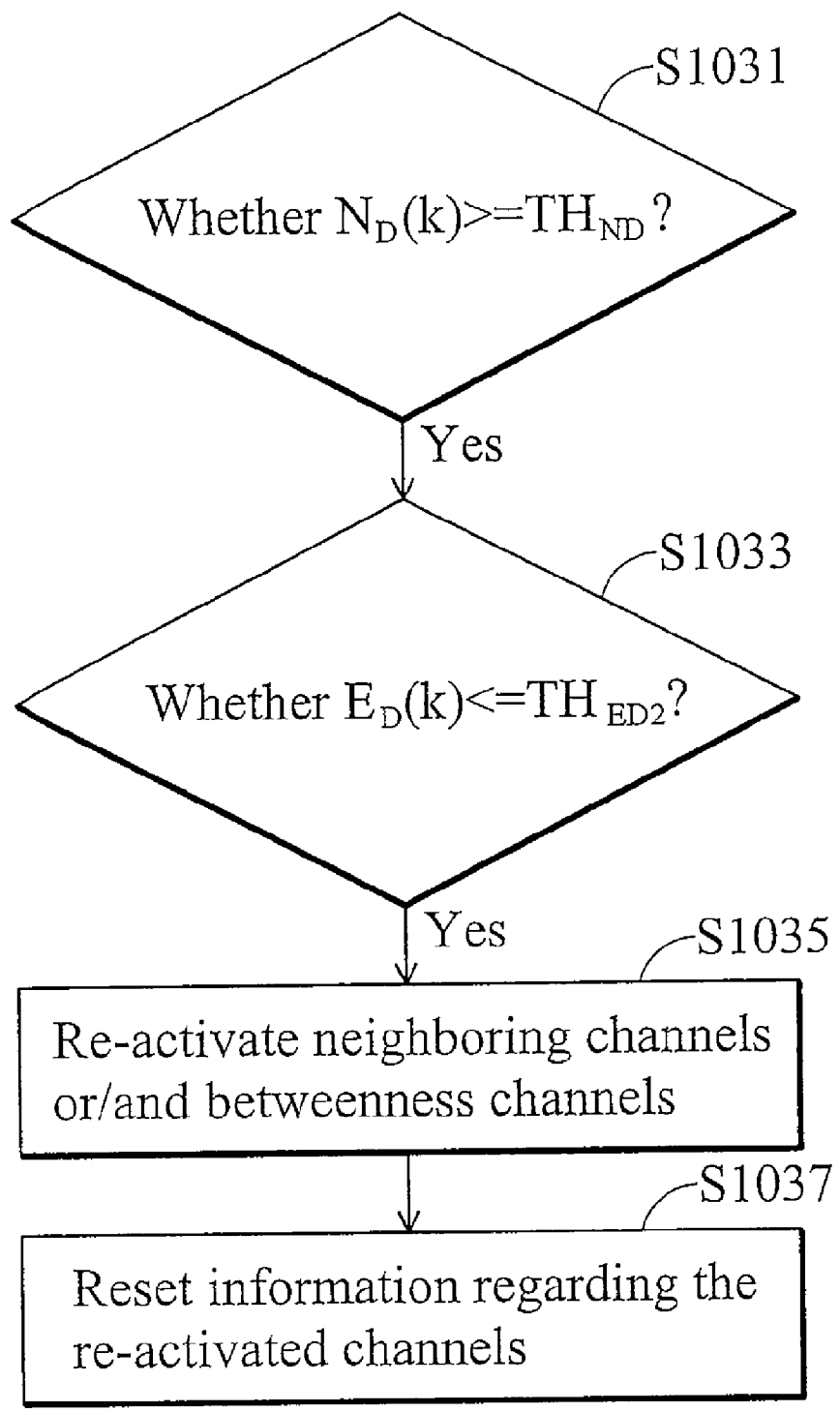
Figure 10C:
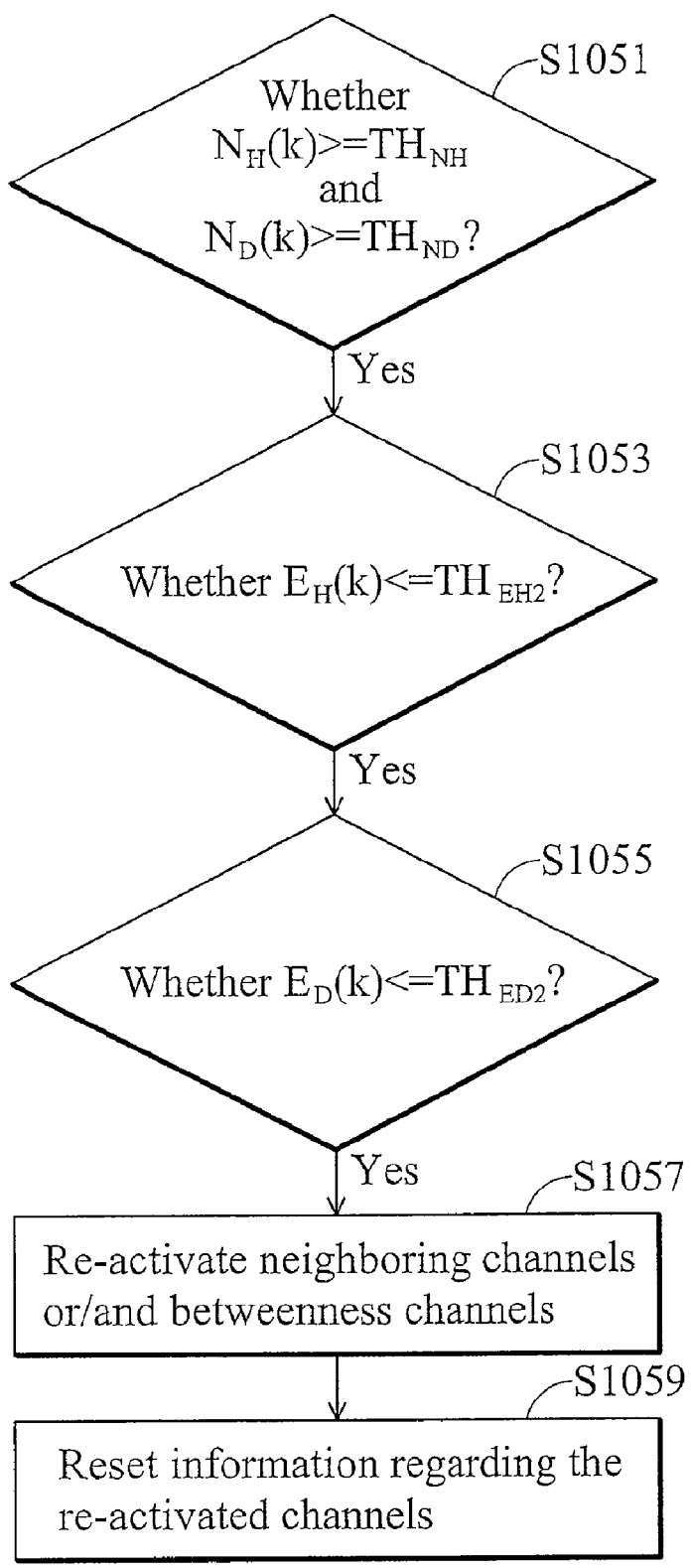

FIGS. 10A to 10C are flowcharts illustrating embodiments of good channel determination methods for a channel k. These processes may be applied in steps S833, S851 and S853. Referring to FIG. 10A, it is determined whether a confidence level of a packet error score of channel k, denoted as $N_H(k)$, is higher than or equals a predetermined threshold $TH_{NH}$, and the packet error score of channel k is lower than or equals a predetermined threshold $TH_{EH2}$ (steps S1011 and S1013). Note that the predetermined threshold $TH_{EH2}$ is substantially lower than the described threshold $TH_{EH1}$ employed in step S911 or S951, and the order of steps S1011 and S1013 may be swapped. When these two conditions are satisfied, neighboring channels, or/and betweenness channels are re-activated (step S1015), and information regarding the re-activated channels in a channel map (e.g. FIG. 4) is reset (step S1017). Referring to FIG. 10B, it is determined whether a confidence level of a data error score of channel k, denoted as $N_D(k)$, is higher than or equals a predetermined threshold $TH_{ND}$, and the data error score of channel k is lower than or equals a predetermined threshold $TH_{ED2}$ (steps S1031 and S1033). Note that the predetermined threshold $TH_{ED2}$ is substantially lower than the described threshold $TH_{ED1}$ employed in step S951 or S953, and the order of steps S1031 and S1033 may be swapped. When these two conditions are satisfied, neighboring channels, or/and betweenness channels are re-activated (step S1035), and information regarding the re-activated channels in a channel map (e.g. FIG. 4) is reset (step S1037). Referring to FIG. 10C, it is determined whether confidence levels of packet and data error scores of channel k, denoted as $N_H(k)$ and $N_D(k)$, are respectively higher than or equals predetermined thresholds $TH_{NH}$ and $TH_{DH}$, and the packet and data error scores of channel k are respectively lower than or equals predetermined thresholds $TH_{EH2}$ and $TH_{ED2}$ (steps S1051 to S1055). Note that the predetermined threshold $TH_{EH2}$ is substantially lower than the described threshold $TH_{EH1}$ employed in step S911 or S951, the predetermined threshold $TH_{ED2}$ is substantially lower than the described threshold $TH_{ED1}$ employed in step S951 or S953, and the order of steps S1051 to S1055 may be rearranged. When these three conditions are satisfied, neighboring channels, or/and betweenness channels are re-activated (step S1057), and information regarding the re-activated channels in a channel map (e.g. FIG. 4) is reset (step S1059). Note that, when a confidence level for one channel exceeds or equals a corresponding threshold, the information collection for the channel is sufficient.

Figure 11A:
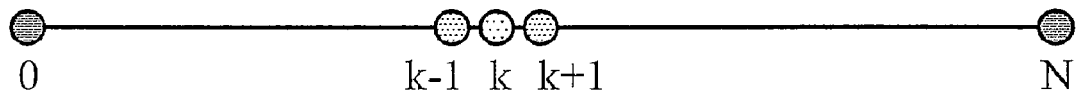
FIG. 11A is a diagram illustrating exemplary neighboring channels.

Referring to steps 1015 of FIG. 10A, 1035 of FIG. 10B, and 1057 of FIG. 10C, FIG. 11A is a diagram illustrating exemplary neighboring channels (k−1) and (k+1). Suppose that a frequency band between 2.4 GHz and 2.48 GHz is divided into eighty channels of 1 MHz, and channel k is between 2.445 and 2.446 GHz, a neighboring channel (k−1) is between 2.444 and 2.445 GHz, and another neighboring channel (k+1) is between 2.446 and 2.447 GHz. It is to be understood that the neighboring channels may also be channels (k−i) and (k+i), where i is a non-zero integer, and is lower than or equals a predetermined integer n. For example, channels (k−3), (k−2), (k−1), (k+1), (k+2) and (k+3) are neighboring channels while n=3.

Figure 11B:
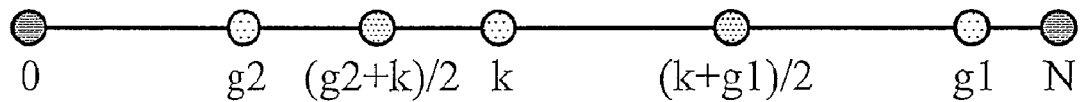
FIG. 11B is a diagram illustrating exemplary betweenness channels.

Referring to steps 1015 of FIG. 10A, 1035 of FIG. 10B, and 1057 of FIG. 10C, FIG. 11B is a diagram illustrating exemplary betweenness channels (g2+k)/2 and (k+g1)/2, where a higher frequency channel g1 and a lower frequency channel g2 are the nearest ones without bad channel marks from the channel k. Suppose that a frequency band between 2.4 GHz and 2.48 GHz is divided into eighty channels of 1 MHz, channel k is between 2.450 and 2.451 GHz, the nearest higher frequency channel without a bad channel mark g1 from the channel k is between 2.470 and 2.471 GHz, and the nearest lower frequency channel without a bad channel mark g2 from the channel k is between 2.440 and 2.441 GHz, a betweenness channel (g2+k)/2 is between 2.445 and 2.446 GHz, and another betweeness channel (k+g1)/2 is between 2.460 and 2.461 GHz. It is to be understood that the betweenness channels may also be channels (g2+k)/2+i, (g2+k)/2−i, (k+g1)/2+j, and (k+g1)/2−j, where i and j are non-zero integers, i is lower than or equals a predetermined integer m, and j is lower than or equals a predetermined integer n. For example, channels (g2+k)/2−1, (g2+k)/2−2, (g2+k)/2+1, (g2+k)/2+2, (k+g1)/2−1, (k+g1)/2−2, (k+g1)/2+1 and (k+g1)/2+2 are betweenness channels while i=2, and j=2.

It is to be understood that the channel re-activation of neighboring or/and betweenness channels is achieved by updating corresponding bad channel flags to erase bad channel marks, as shown in FIG. 4. The re-activated channels are reset by setting corresponding header error scores, confidence levels thereof, data error scores, and confidence levels thereof to zeros.

Methods for channel assessment, or certain aspects or portions thereof, may take the form of program codes (i.e., instructions) embodied in tangible media, such as floppy diskettes, CD-ROMS, hard drives, or any other machine-readable storage medium, wherein, when the program codes are loaded into and executed by a machine, such as a computer, a mobile phone or similar, the machine becomes an apparatus for practicing the invention. The disclosed methods may also be embodied in the form of program codes transmitted over some transmission medium, such as electrical wiring or cabling, through fiber optics, or via any other form of transmission, wherein, when the program codes are received and loaded into and executed by a machine, such as a computer, the machine becomes an apparatus for practicing the invention. When implemented on a general-purpose processor, the program codes combine with the processor to provide a unique apparatus that operate analogously to specific logic circuits.

Certain terms are used throughout the description and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in the art can make various alterations and modifications without departing from the scope and spirit of the invention. Therefore, the scope of the invention shall be defined and protected by the following claims and their equivalents.

What is claimed is:

1. An apparatus for channel assessment, comprising:
 a radio frequency (RF) unit;
 a baseband unit coupling to the RF unit, and directing the RF unit to selectively hop into one of a plurality of available channels in a frequency band using a pseudo-random sequence to receive a plurality of packets via the hopped channel; and a microprocessor control unit (MCU) coupling to the baseband unit, accumulating a measure for the hopped channel according to reception results of the packets, and marking the hopped channel as a bad channel when the accumulated measure exceeds a predetermined threshold, where during packet reception via the hopped channel, the MCU increases the measure by a predefined first value when a packet is lost, increases the measure by a predefined second value smaller than the predefined first value when a received packet header does not pass error check, and increases the measure by a bit error count representing a quantity of bits have been corrected when a received packet header passes error check, the MCU further canceling a bad mark for a re-activation channel other than the hopped channel, wherein any channel without a bad mark can be hopped, and the re-activation channel is a betweenness channel between the hopped channel and a higher frequency channel g1 without a bad mark, or between the hopped channel and a lower frequency channel g2 without a bad mark;

wherein the measure represents the inaccuracy extent of a plurality of packet headers during packet reception via the hopped channel.

2. The apparatus as claimed in claim 1 wherein the channel band is substantially between 2.4 GHz and 2.48 GHz.

3. The apparatus as claimed in claim 1 wherein the MCU stores information indicating that the hopped channel is marked as a bad channel in a channel map, enabling the baseband unit to employ a protocol known to a peer device, with messages for communicating which channels therein may be used and which are to be avoided according to the channel map.

4. The apparatus as claimed in claim 1 wherein the packet header comprises header error check (HEC) of 8 bits, and the MCU utilizes the HEC bits to correct the received packet header.

5. The apparatus as claimed in claim 1 wherein whether packet data of a packet passes error check is determined by inspecting cyclical redundancy checking (CRC) bits thereof.

6. An apparatus for channel assessment, comprising:
a radio frequency (RF) unit;
a baseband unit coupling to the RF unit, and directing the RF unit to hop into one of a plurality of available channels in a frequency band using a pseudorandom sequence to receive a plurality of packets via the hopped channel; and
a microprocessor control unit (MCU) coupling to the baseband unit, determining the hopped channel k as a good channel according to reception results for the packets, and canceling a bad mark for a re-activation channel other than the hopped channel k,
wherein any channel without a bad mark can be hopped, and the re-activation channel is a betweenness channel between the hopped channel k and a higher frequency channel g1 without a bad mark, or between the hopped channel k and a lower frequency channel g2 without a bad mark.

7. The apparatus as claimed in claim 6 wherein the higher frequency channel g1 is the nearest channel without a bad mark from the hopped channel k.

8. The apparatus as claimed in claim 6 wherein the lower frequency channel g2 is the nearest channel without a bad mark from the hopped channel k.

9. The apparatus as claimed in claim 6 wherein the betweenness channel is the $((g2+k)/2)$ channel or the $((k+g1)/2)$ channel.

10. The apparatus as claimed in claim 6 wherein the MCU resets a measure corresponding to the re-activation channel, the measure represents the inaccuracy extent during previous packet reception via the re-activation channel.

11. The apparatus as claimed in claim 6 wherein the hopped channel is determined as a good channel when a confidence level for the hopped channel is higher than a first threshold, and a measure for the hopped channel is lower than a predetermined second threshold, where the confidence level represents times for receiving packets during packet reception via the hopped channel, and the measure representing the inaccuracy extent for reception results of the packets is accumulated during packet reception via the hopped channel.

12. The apparatus as claimed in claim 11 wherein a channel is marked as a bad channel when a measure representing the inaccuracy extent for reception results of a plurality of packets via the marked channel exceeds a predetermined third threshold, and the third threshold is higher than the second threshold.

13. The apparatus as claimed in claim 11 wherein the measure represents the inaccuracy extent of a plurality of packet headers during packet reception via the hopped channel.

14. The apparatus as claimed in claim 11 wherein the measure represents the inaccuracy extent of packet data of a plurality of packets during packet reception via the hopped channel.

15. A method for channel assessment, executed by a microprocessor control unit (MCU) of an apparatus, where the apparatus comprises a radio frequency (RF) unit, the method comprising:
determining a plurality of hopped channels k as bad channels according to reception results for the packets, where any of the bad channels in a frequency band cannot be hopped into by the RF unit; and
canceling a bad mark for a re-activation channel other than the hopped channel k,
wherein the re-activation channel is a betweenness channel between the hopped channel k and a higher frequency channel gi without a bad mark, or between the hopped channel k and a lower frequency channel g2 without a bad mark.

16. The method as claimed in claim 15, wherein the higher frequency channel g1 is the nearest channel without a bad mark from the hopped channel k, and the lower frequency channel g2 is the nearest channel without a bad mark from the hopped channel k.

17. The method as claimed in claim 15, wherein the betweenness channel is the $((g2+k)/2)$ channel or the $((k+g1)/2)$ channel.

18. The method as claimed in claim 15, wherein the determination step further comprises marking one of the channels as a bad channel when a measure representing the inaccuracy extent for reception results of a plurality of packets via the marked channel exceeds a predetermined threshold.

* * * * *